(12) United States Patent
Garg et al.

(10) Patent No.: US 10,592,825 B2
(45) Date of Patent: *Mar. 17, 2020

(54) APPLICATION PLACEMENT AMONG A SET OF CONSOLIDATION SERVERS UTILIZING LICENSE COST AND APPLICATION WORKLOAD PROFILES AS FACTORS

(75) Inventors: Ankit Garg, New Delhi (IN); Tapan K. Nayak, New Delhi (IN); Aritra Sen, New Delhi (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1486 days.

This patent is subject to a terminal disclaimer.

(21) Appl. No.: 13/165,989

(22) Filed: Jun. 22, 2011

(65) Prior Publication Data

US 2012/0330700 A1    Dec. 27, 2012

(51) Int. Cl.
   *G06Q 10/00* (2012.01)
(52) U.S. Cl.
   CPC .................................. *G06Q 10/00* (2013.01)
(58) Field of Classification Search
   USPC .......................................................... 705/59
   See application file for complete search history.

(56) References Cited

U.S. PATENT DOCUMENTS

| | | | |
|---|---|---|---|
| 7,761,548 B2* | 7/2010 | Snyder | G06Q 10/06 702/182 |
| 7,836,452 B2 | 11/2010 | Taylor | |
| 8,245,140 B2* | 8/2012 | Barber | G06F 9/4856 345/440 |
| 2007/0094375 A1 | 4/2007 | Snyder et al. | |
| 2009/0144393 A1* | 6/2009 | Kudo | G06F 9/5044 709/218 |
| 2010/0005173 A1* | 1/2010 | Baskaran | G06F 15/16 709/226 |
| 2012/0331114 A1 | 12/2012 | Garg et al. | |

OTHER PUBLICATIONS

Office Action, dated Mar. 19, 2015, regarding U.S. Appl. No. 13/410,941, 22 pages.
Final Office Action, dated Sep. 10, 2015, regarding U.S. Appl. No. 13/410,941, 22 pages.

* cited by examiner

*Primary Examiner* — Zeshan Qayyum
(74) *Attorney, Agent, or Firm* — Yee & Associates, P.C.

(57) ABSTRACT

Applications in a data center can be consolidated by identifying different combinations of software executing on hardware. The software can include a set of applications that execute upon a set of servers. The different combinations can have different arrangements of applications running on different ones of the servers. For each of the different combinations, a licensing cost, an operating cost, and a total cost can be calculated. The total cost of operation for each of the configurations can be calculated by summing the licensing costs, the operating costs adjusted for the cost savings for complementary workload patterns, and migration costs for adjusting a current configuration of the applications and servers to arrive at the configuration. The total cost results per configuration can be reported to a user for at least a set of the configurations.

9 Claims, 3 Drawing Sheets

APPLICATION PLACEMENT AMONG A SET OF CONSOLIDATION SERVERS UTILIZING LICENSE COST AND APPLICATION WORKLOAD PROFILES AS FACTORS

BACKGROUND

The present invention relates to server consolidations.

Server consolidation is an approach to the efficient usage of computer server resources in order to reduce the total number of servers or server locations that an organization requires. The practice developed in response to the problem of server sprawl, a situation in which multiple, under-utilized servers take up more space and consume more resources than can be justified by their workload. When servers are consolidated, physical servers with low utilization loads are often virtualized and consolidated as virtual machines running on a set of physical servers.

Although consolidation can substantially increase the efficient use of server resources, it may also result in complex configurations of data, applications, and servers that can be confusing. Analysis tools/applications exist that help Information Technology (IT) administrators plan and efficiently implement a consolidation of an IT environment. Many consolidation choices are tradeoffs, where choices that optimize a consolidation effort for one set of factors have a negative impact on a different set of factors.

With a current rise in cloud computing, Web services, middleware platforms, and other network-based technologies—server consolidations become increasingly important and complex. Conventional analysis and planning tools have not adapted sufficiently to handle the increased complexities required of server farms in an information technology environment where cloud-computing is commonplace. That is, conventional analysis and planning tools are imperfect in that they fail to account for significant factors that strongly impact overall costs in a server-farm/middleware. For example, most consolidation analysis and planning tools fail to consider application level factors.

BRIEF SUMMARY

An embodiment for efficiently consolidating servers can store information in at least one storage medium that details a set of applications running on a set of servers. The one or more storage medium(s) can store licensing data for the applications that includes licensing costs. The storage medium(s) can also store workload requirements for the applications running on the servers. The storage medium(s) can record specifics of computing resources provided by each of the servers. The workload requirements of the applications can be mapped to computing resources of the servers. Dependencies can be determined for the applications running on the servers. The licensing costs for the applications can consider costs consistent with the dependencies. The application workload can include workload requirements for software executing on the servers that are consistent with the dependencies. A first configuration and a second configuration of the applications executing on the servers can be determined. The first configuration and the second configuration can assure the applications are placed within specific ones of the servers, such that the computing resources of the servers upon which the applications are placed satisfies application workload requirements of the applications given resources provide by the corresponding server that runs the applications. Different applications can be placed on different ones of the servers in the first configuration and in the second configuration. Licensing costs can be calculated for the first configuration and for the second configuration. Operational costs for running the applications and servers can be calculated in accordance with the first configuration and in accordance with the second configuration. Total costs for the first configuration and for the second configuration can be calculated. The licensing costs and the operating costs can be added when calculating the total costs. One of the first configuration and the second configuration can be recommended depending on which configuration has a lower total cost in accordance with the calculations. Results of the recommending can be provided to an authorized administrator as part of a programmatic action for consolidating the applications and the servers.

An embodiment for consolidating applications in a data center can include identifying different combinations of software executing on hardware. The software can include a set of applications that execute upon a set of servers. Each of the servers can be a virtual machine executing on a virtualization level of an information technology environment. The different combinations can have different arrangements of applications running on different ones of the servers. For each of the different combinations a licensing cost, an operating cost, and a total cost can be calculated. The licensing cost of the applications can vary in value from configuration-to-configuration, as different arrangements of applications on servers necessary to satisfy an application workload can affect a quantity and cost of software licenses needed for executing the applications per that configuration. The operating costs for running the applications can vary from configuration-to-configuration based on cost savings achieved through hosting applications with complementary workload patterns on a common one of the servers. A total cost of operation for each of the configurations can be calculated by summing the licensing costs, the operating costs adjusted for the cost savings for complementary workload patterns, and migration costs for adjusting a current configuration of the applications and servers to arrive at the configuration for which the total cost is being calculated. The total cost results per configuration can be reported to a user for at least a set of the configurations.

DETAILED DESCRIPTION

Figure 1:
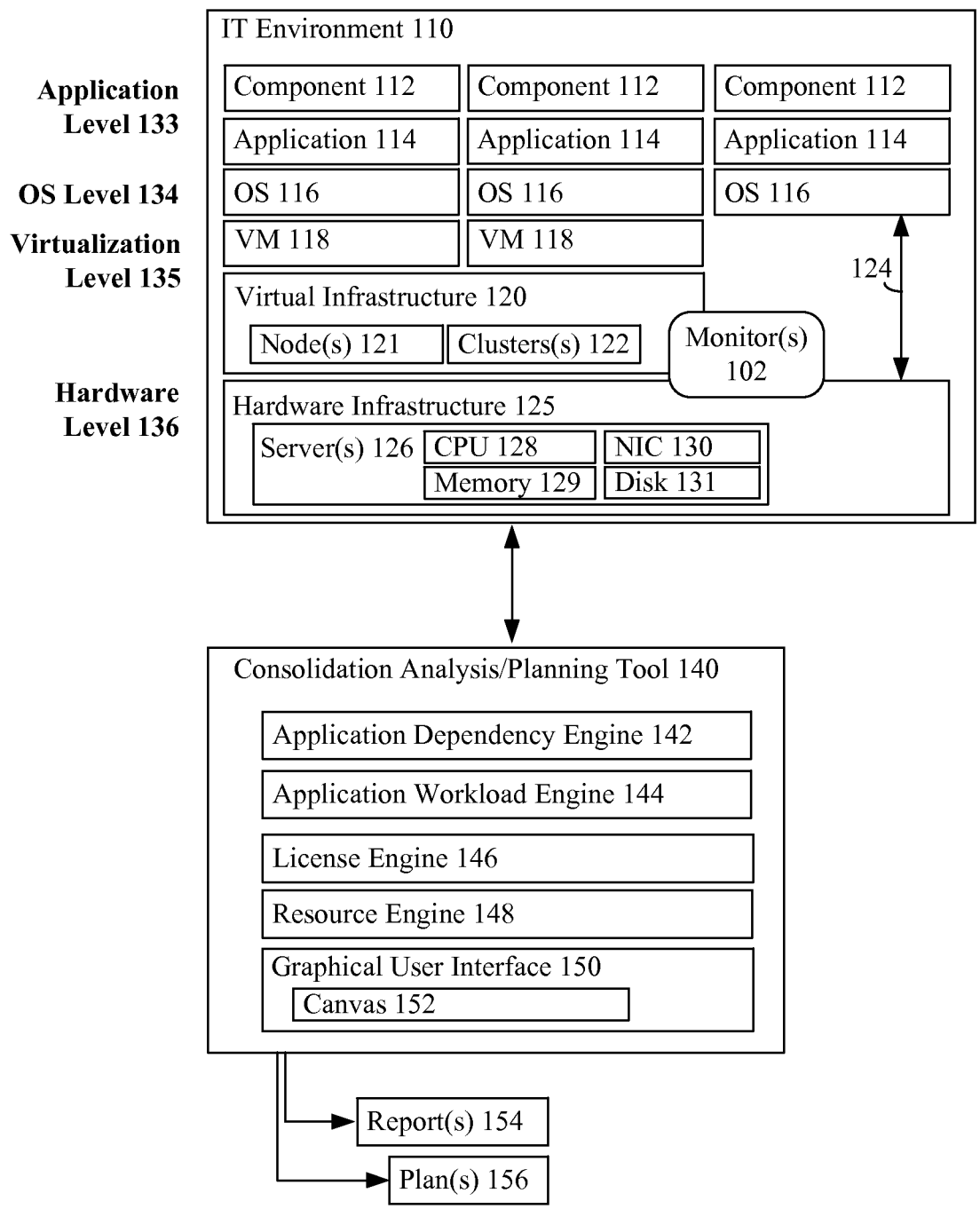
FIG. 1 shows a diagram of a consolidation tool, which optimizes costs based on complementary application workload, application licensing cost, and other optional factors in accordance with an embodiment of the inventive arrangements disclosed herein.

Many application level considerations are significant when performing/planning server consolidation tasks. Some of these considerations are directly competing, or can only be optimized in part. The present solution considers multiple different levels during a consolidation effort, which include application level considerations, and virtualization level considerations. The application level considerations include which applications are most suitable on which application servers (real or virtual). Hence, a consolidation analysis tool (application) is provided that functions at multiple levels and that minimizes total cost considering complementary workload patterns, application licensing costs, as well as other cost-significant factors.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to the figures, FIG. 1 shows a diagram 100 of a consolidation tool 140, which optimizes costs based on complementary application workload, application licensing cost, and other optional factors in accordance with an embodiment of the inventive arrangements disclosed herein.

That is, the consolidation tool 140 can consider application 114 dependencies (using application dependency engine 142, for example), application workload (using application workload engine 144, for example), application licensing costs (using license engine 146, for example), and other factors. The consolidation tool 140 can perform analysis, planning, optimization, and other such functions. Using available data and user configurable parameters, the consolidation tool 140 can generate reports 154 and/or plans 156. The tool 140 can be a data-driven one, which leverages static and dynamic conditions. In one embodiment, changes in the dynamic conditions can trigger events/thresholds of the tool 140, which automatically generates configuration/optimization changes in response.

The consolidation tool 140 can utilize manually entered information as well as automatically gathered information. Manually entered information can be input specific for the tool 140 and/or acquired from other systems, which are communicatively linked to the consolidation tool 140. Automatically gathered information can be acquired from one-or-more monitors 102 deployed within the IT environment 110. The monitors 102 can detect conditions, values, states, and/or other such data points relevant to the IT environment 110.

The consolidation tool 140 can use application level 133 factors as well as factors from one or more other levels 134-136. The other levels can include operating system level 134, virtualization level 135, and/or hardware level 136.

Application level 133 refers to applications 114 and other components 112 that execute in the IT environment 110. Specifically, a component 114 can be an executable used by one of the applications 114. Components 114 can include application program interfaces (APIs), plug-ins, enhancements, and the like.

Each application 114 can be a computer program running on an operating system 116. Each application 114 can be designed to help people perform an activity or a set of activities. Software applications 114 can include server applications and client applications. Applications 114 can include horizontal applications as well as vertical applications. Examples of applications 114 include, but are not limited to, enterprise software, accounting software, office suites, graphics software, media playing software, text and document manipulation software, Web services, and the like.

The operating system 116 can include software consisting of programs and data which runs on a machine, such as a server 126, a desktop, a mobile device, an embedded device, a virtual machine 118, and the like. The operating system can manage hardware resources and can provide common services for execution of applications 114. The operating system 116 can act as an intermediary between the applications 114 and hardware (real or virtual) resources. That is, operating systems 116 can execute directly (communications 124) with hardware of a hardware infrastructure 125 or can interface with a virtual hardware provided by a virtual machine 118 of a virtual infrastructures 120.

A virtual machine (VM) 118 can be a software implementation of a machine (i.e. a computer) that executes programs like a physical machine. Virtual machines can provide a complete system platform which supports the execution of a complete operating system (OS) 116. That is, a virtual machine 118 can be a tightly isolated software container that can run its own operating systems 116 and applications 114 as if it were a physical computer (e.g., server 126). A virtual machine 118 can contains its own virtual (i.e., software-based) CPU 128, volatile memory 129, non-volatile memory 131, network interface card (NIC) 130, and the like.

Virtual machines 118 can depend upon a virtual infrastructure 120, which is a software defined abstraction level that keeps virtual machines 118 independent of underlying physical hardware (e.g., hardware infrastructure 125). Because of this abstracting, a virtual machine 118 can be configured with virtual components different from the physical components that are present on the underlying hardware. A single physical server 126 can provide resources for multiple different virtual machines 118. A single virtual machine 118 can use resource from multiple different servers 126.

Further, complex mappings of arbitrary complexity can be established between virtual resources provided by a virtual infrastructure 120 and the underlying physical resource provided by the hardware infrastructure 125. For this reason, a grouping of resources within a virtual infrastructure 120, which is used by the virtual machine 118, can be referred to as a node 121. A set of nodes 121 can be used to define a cluster 122. Some virtual infrastructures 120 have an ability to dynamically redefine hardware resources (infrastructure 125) while not impacting runtime execution of applications 114 and OS 116.

Some virtual infrastructures 120 have fault tolerance capabilities, high availability capabilities, automatic load balancing capabilities, and the like. Thus, it can be relatively easy to re-arrange physical resources (CPU 128, memory 129, NIC 130, disk 131) relative to various virtual machine nodes 121 and clusters 122, which can affect resources of the virtual machines 118, which can affect performance of applications 114 running on the virtual machines 118. Sometimes, a performance degradation or cost results from use of virtualization technologies (e.g., using a virtual infrastructure 120), which can be in the neighborhood of a 20-30% overall loss of resources consumed by the virtual infrastructure 120. Thus, sometimes an optimal IT environment 110 can use a combination of virtualized servers and non-virtualized servers, which overall results in low cost, scalability, and reliability gains. For the purposes of the disclosure, the IT environment 110 can be configured in a myriad of different manners, which can result in different applications 114 running on different sets of servers 126 (or VM 118). The resource engine 148 can process and manage information relating to hardware level 136 and/or virtualization level 135 computing resources.

Applications 114, components 112, and operating systems 116 can each have dependencies among them. That is, applications 114 can execute on a specific operating system 116. Some applications 114 can execute in conjunction with other applications 114 (e.g., many applications require a database back-end to operate). Components 112 can also require a particular application 114 or set of applications 114 before executing. The application dependency engine 142 can be responsible for determining these dependencies.

Each application 114 and/or component 112 can have its own workload, which can have a characteristic pattern. The application workload can consume a quantifiable set of computing resources. Further, the application workload of the various applications 114 can have interrelationships, where some applications 114 have a complementary workload, which makes it more efficient to execute those applications on a common server 126, virtual machine 118, node 121, and/or cluster 122 than otherwise. The application workload engine 144 can manage application workload specific data and complexities.

Additionally, use of the applications 114, components 112, operating system 116, and even the virtual infrastructure 120 can require a software license. Details of the software licenses can vary significantly. For example, some software licenses are for a one-time fee, others require an annual fee for use (e.g., a yearly fee), others are for a usage fee (cost for a quantity of usage time), others depend on a quantity of processors or cores (e.g., CPU 128 real or virtual) used in conjunction with the software, still others depending on a number of concurrent users, etc. Arrangements of the software relative to the sets of servers 126 (and resource allocations via the virtual infrastructure 120) can result in significant variances in software licensing costs. The license engine 148 can manage software licensing data and complexities.

In one embodiment, the consolidation tool can include a graphical user interface (GUI) 150, which permits a user to model, view, change, etc. configurations for the IT environment 110. For example, a canvas 152 can be presented within which graphical representations of servers 125 and/or server resources (e.g., CPU 128, memory 129, NIC 130, disk 131) can be arranged and/or combined.

In one embodiment, values from the reports 150 and/or plans 152 can be linked to configuration mechanisms of the virtual infrastructure 106, so that suggested changes can be implemented immediately by an administrator using tool 140 and/or automatically based on events detected by the tool 140. The reports 150 and plans 152 can detail gross license cost, operational costs, migration costs, multiplexing costs, net licensing cost savings, and other cost-based factors. Each of these costs can be decomposed at multiple different levels. Costs can be presented within GUI 150 and linked to configurations modeled in the canvas 152, in one embodiment.

Figure 2:
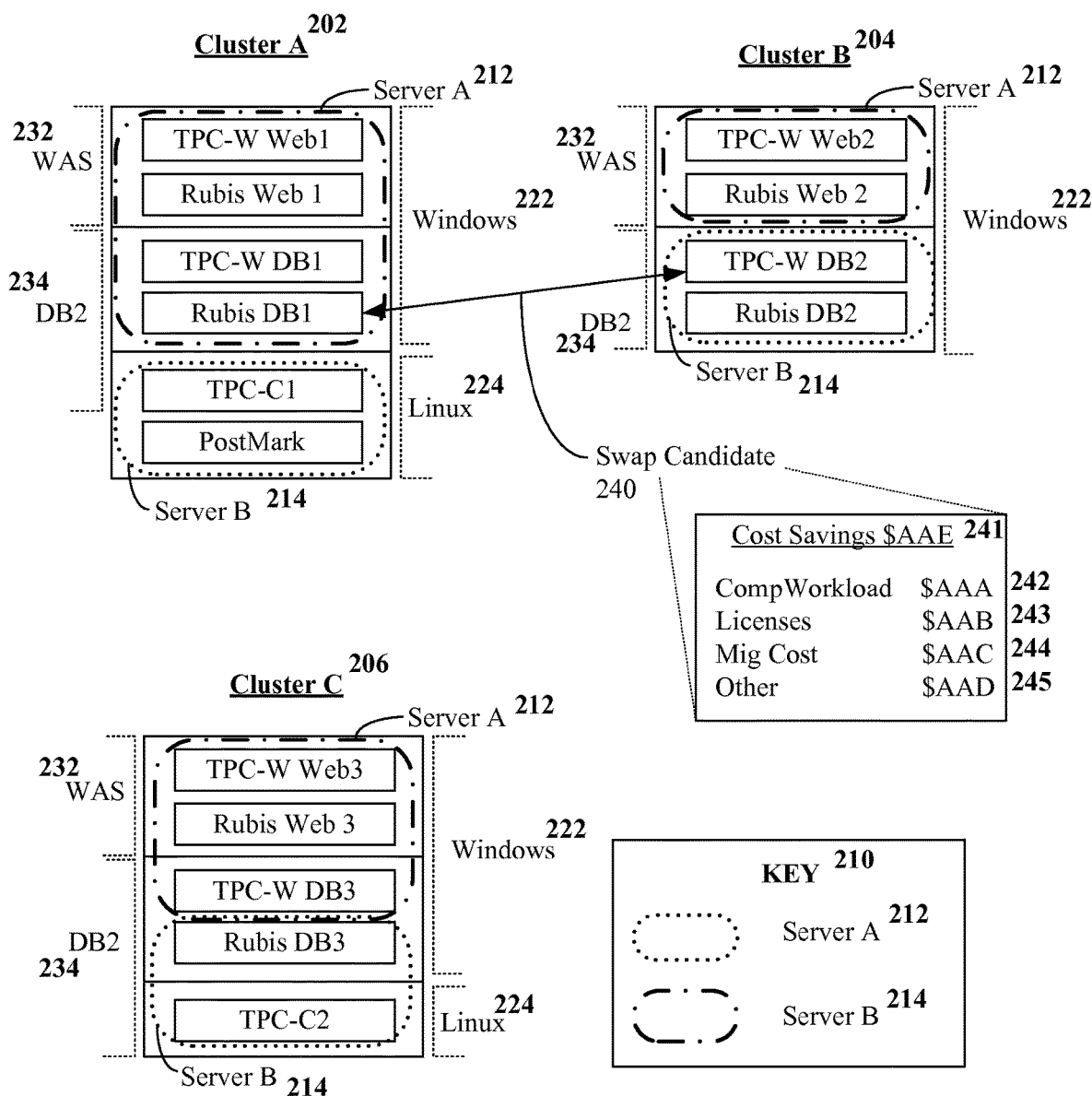
FIG. 2 is a diagram that shows identifying a set of swap candidates based on application licensing costs, application workload, and/or other factors in accordance with an embodiment of the disclosure.

FIG. 2 is a diagram that shows identifying a set of swap candidates 240 based on application licensing costs 243, application workload 242, and/or other factors (migration costs 244, other cost 245, etc.) in accordance with an embodiment of the disclosure. The swap candidate 240 can represent a suggested application arrangement that reduces overall cost 241 (compared to a different planned configuration and/or compared to an existing arrangement). Factors and/or weights that are used to calculate cost 241-245 can be adjusted (such as by adjusting values used by consolidation tool 140), which can change the swap candidates 240.

As shown, a set of applications can execute on different servers 212, 214, which are labeled as Server A and Server B, as shown by key 210. The servers 212, 214 are used in multiple clusters 202, 204, 206, which are shown as Cluster A, Cluster B, and Cluster C. Multiple applications execute per cluster 202-206 and per server 212-214. Each application can run on a specific operating system (OS), such as WINDOWS 222, LINUX 224, and the like. Further, different ones of the applications require a specific back-end to operate, such as WEBSPHERE APPLICATION SERVER (WAS) 232 and DB2 234.

As shown, the consolidation tool 140 can determine that it would be more cost effective (given the application loads running in each cluster 202-206 to run the Rubis DB1 application on Server B in Cluster B and to run the TCP-W DB2 application in Cluster A within Server A. The workloads can complement still, after the swap 240 occurs. The additional benefit of the swap 240 can be that Server A will be the only server that runs the TCP-W application.

It should be appreciated that FIG. 2 is a very simplistic example, which will quickly produce numerous other potential savings (via licensing and other application swap opportunities), as the possibilities for swapping increase.

Figure 3:
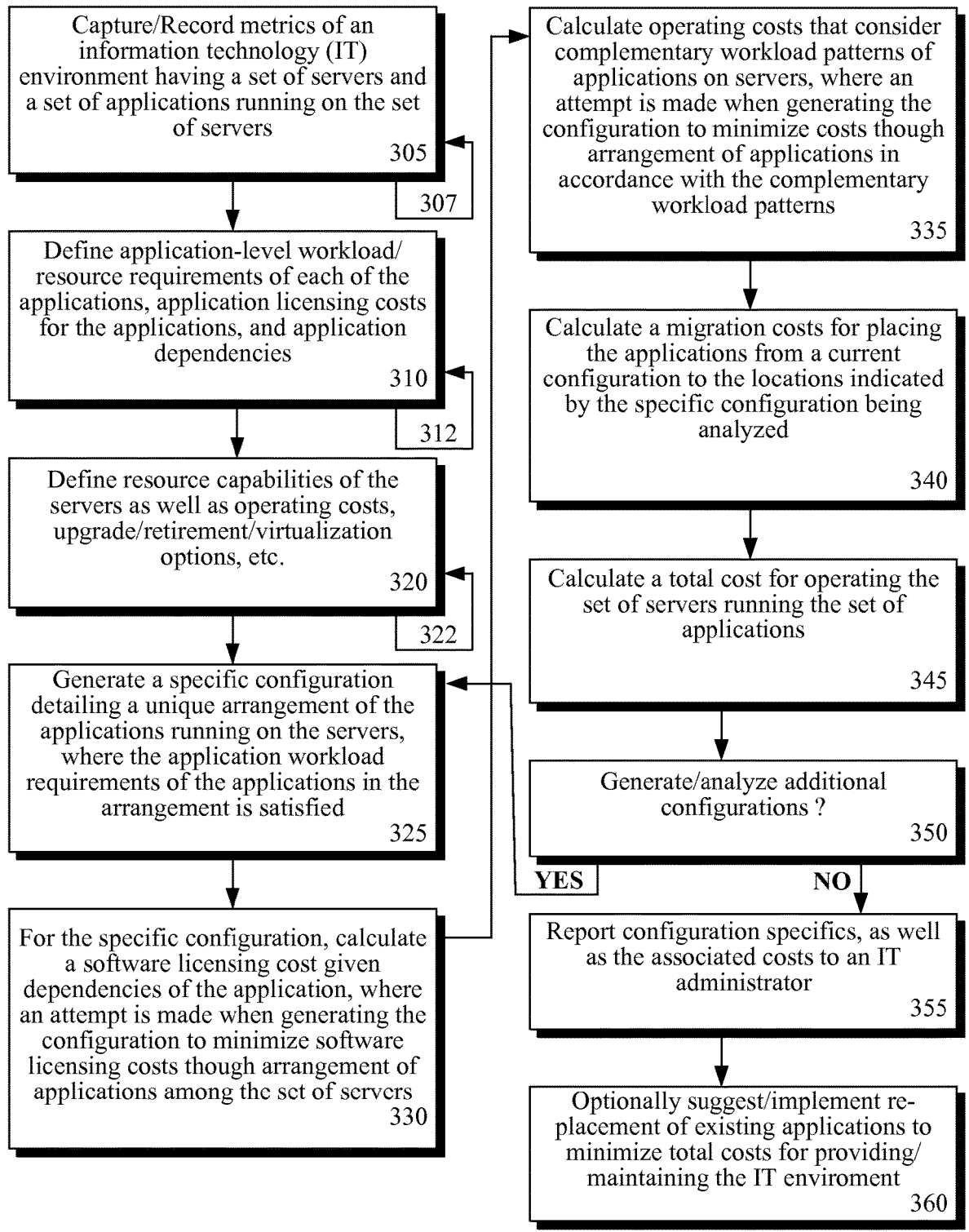
FIG. 3 is a flow chart of a method for reducing overall costs for an IT environment by intelligent placement of applications within a set of servers in accordance with an embodiment of the disclosure.

FIG. 3 is a flow chart of a method 300 for reducing overall costs for an IT environment by intelligent placement of applications within a set of servers in accordance with an embodiment of the disclosure.

Method 300 can begin in step 305, where metrics can be captured and/or recorded for an IT environment having a set of servers and a set of applications running on the servers. These metrics can be continuously updated, as noted by repeating step 307.

In step 310, application level workload/resource requirements can be defined for each of the applications. The workload can be predicted based on historic patterns, present conditions, and/or predicted based on forecasted workload requirements. The application level workload can be mapped to a set of computing resources (e.g., CPU cycles, RAM memory requirements, disk space, network bandwidth, etc.), which can be broken down by resource type in one embodiment. Additionally, application license costs (and software licensing costs in general) can be determined for the applications as well as dependencies for the applications. The workload, licensing, and dependencies can be continuously updated as changes occur, as noted by repeating step 312.

In step 320, resource capabilities of the set of servers that run the applications can be defined. These resource capabilities can be defined at the hardware infrastructure level and/or at the virtualization infrastructure level. Additional factors subject to change that relate to the resource capabilities can be recorded and stored. These factors can include, for example, upgrade costs of hardware, retirement costs of existing systems, virtualization costs and options, and the like. Resource information can be continuously updated, as noted by repeating step 322.

In step 325, a specific configuration can be generated for the IT environment. This configuration can detail a unique arrangement of the applications running on the servers (virtualized or not). The configuration can be constructed with constraints to ensure that the application workload requirements are satisfied.

In step 330, software licensing costs can be calculated for the configuration. The software licensing costs can be evaluated in context of the required application dependencies. The software licensing costs can include component licensing costs, application licensing costs, operating system licensing costs, virtualization software licensing costs, middleware licensing costs, and the like. In one embodiment, the configuration(s) generated in step 325 can be specifically arranged to minimize software licensing costs.

In step 335, operating costs can be calculated for the configuration. The operating costs can consider complementary workload patterns of applications running on the servers. That is, a required set of servers and/or time of operation of the servers) can be reduced through use of the complementary workload patterns. In one embodiment, configuration(s) generated in step 335 can represent an attempt to minimize costs by considering complementary workload patterns.

In step 340, migration costs can be determined for placing the applications/servers/virtual machines into the configuration generated by step 325 from a current configuration. A total cost of operating the IT environment can be computed in step 345. This total cost can be a summation of software licensing cost, operating costs, migration costs, and other optional factors (future value, depreciation, maintenance cost, etc.).

In step 350, a determination can be made as to whether additional configurations are to be generated (or analyzed). If so, the method progresses from step 350 back to step 325. When no additional configurations are to be generated (or analyzed), the method proceeds from step 350 to step 355. In step 355, configuration specifics can be reported to an IT administrator, such as via reports 154 and/or plans 156. In step 360, replacements for existing applications and/or application placements can be suggested and/or implemented within the IT infrastructure, which minimizes the total costs for providing, operating, and maintaining the IT environment.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer program product for handling media, the computer program product comprising:
    a computer usable non-transitory storage medium having computer usable program code embodied therewith, the computer usable program code configured to instruct a data processor to perform steps of:
    storing information on a storage medium, wherein said information is for a set of applications running on a set of servers, said information comprising:
        (i) licensing data for the set of applications that includes licensing costs per application,
        (ii) application workload requirements for the set of applications running on the set of servers, and
        (iii) records of computing resources of each of the set of servers;
    mapping the application workload requirements of the set of applications to the computing resources of the set of servers;
    determining dependencies for the set of applications running on the set of servers;
    identifying various arrangements to place the set of applications within different ones of the set of servers based on the licensing data, the application workload requirements and the records of computing resources;
    generating a plurality of configurations for the set of applications running on the set of servers, wherein said plurality of configurations comprises a first configuration and a second configuration, wherein different arrangements of the set of applications are placed within different ones of the set of servers in the first configuration and in the second configuration, wherein each of the plurality of configurations are generated:
        (i) to assure that the set of applications are placed within specific ones of the set of servers, and
        (ii) to assure that computing resources of each of the set of servers upon which the set of applications are placed satisfies application workload requirements of a server-subset of the set of applications that are placed within that server;
    calculating licensing costs for the first configuration and for the second configuration, wherein the licensing costs are determined for licenses associated with the set of applications and the dependencies;
    calculating operational costs for the first configuration and for the second configuration;
    calculating total costs for the first configuration and for the second configuration, including summing the licensing costs and the operating costs when calculating the total costs;
    recommending one of the first configuration and the second configuration depending on which configuration has a lower total cost in accordance with the calculations;
    providing results of the recommending to an authorized administrator as part of a programmatic action that consolidates the set of applications running on the set of servers;
    responsive to providing the results, consolidating the set of applications into the first configuration or the second configuration according to the results; and
    changing information technology infrastructures for the first configuration and the second configuration using a consolidation tool that includes a graphical user interface, wherein the licensing costs, operational costs, and total costs are calculated automatically and presented within the graphical user interface responsive to specifics constructed using the graphical user interface, wherein as changes are interactively made, cost computations are dynamically and correspondingly changed so that the configurations represented within the graphical user interface have updated and corresponding cost values associated with them.

2. The computer program product of claim 1, wherein the plurality of configurations comprise at least two configurations in addition to the first configuration and the second configuration, the computer program product is further configured to instruct the data processor to perform steps of:
    calculating, for each of the plurality of configurations, the licensing costs, the operational costs, and the total costs for that configuration, wherein a licensing cost for an application of the set of applications varies based on an arrangement of the application relative to the set of servers; and
    recommending one of the plurality of configurations based on the calculated total costs for the plurality of configurations.

3. The computer program product of claim 1, when the licensing costs for the first configuration and the second configuration comprise application licensing costs, middleware licensing costs, and operating system operating costs for operating systems needed by the set of applications per the dependencies.

4. The computer program product of claim 2, wherein specific ones of the plurality of configurations being generated:
    (i) require a purchase of different hardware for the set of servers,
    (ii) require purchasing of additional application licenses, and
    (iii) require a change in application licensing arrangements, said computer program product further comprising computer program code configured to:
        factor in a cost of the different hardware when calculating total costs for the plurality of configurations;
        factor in a cost of purchasing the additional application licensing when calculating total costs for the plurality of configurations; and
        factor in a cost of changing application licensing arrangements when calculating total costs for the plurality of configurations.

5. The computer program product of claim 1, further comprising computer program code configured to instruct the data processor to perform steps of:

calculating a migration cost for migrating the set of applications from an original configuration to the first configuration and from the original configuration to the second configuration; and wherein calculating the total costs for the first configuration and for the second configuration comprises summing the migration costs, the licensing costs and the operating costs.

6. The computer program product of claim 1, wherein calculating the licensing costs for the first configuration and for the second configuration comprises:

determining the licensing cost for the first configuration and the second configuration using application licensing costs, middleware licensing costs, and operating system operating costs for operating systems needed by the set of applications per the dependencies.

7. The computer program product of claim 1, wherein at least a portion of the set of servers are virtual machines running on a virtualization layer of an information technology environment, wherein calculating the total costs for the first configuration and for the second configuration takes operational costs of running the virtual machines into account.

8. The computer program product of claim 1, wherein at least a portion of the set of servers are virtual machines running on a virtualization layer of an information technology environment, wherein calculating the total costs for the first configuration and for the second configuration accounts for hardware-level costs for the set of servers and related components, accounts for virtualization layer costs, and accounts for application level costs.

9. The computer program product of claim 1, wherein the first configuration is generated to represent a current configuration of the set of servers and the set of applications within an information technology (IT) environment, wherein the second configuration is generated to represent a proposed change to the information technology (IT) environment that was programmatically determined by a consolidation tool, wherein the second configuration has a lower total cost than the first configuration, wherein cost savings between the first configuration and the second configuration represent an operational cost savings achieved by consolidating the set of applications with complementary workload usage patterns on a common one of the set of servers and also represent a cost savings with needing fewer software license due to a placement of the set of applications within the set of servers, wherein placement of the set of applications within the set of servers in the second configuration represents a tradeoff between licensing costs and complementary application workloads.

* * * * *